(12) United States Patent
Yu

(10) Patent No.: US 8,638,407 B2
(45) Date of Patent: Jan. 28, 2014

(54) LIQUID CRYSTAL DISPLAY (LCD) SYSTEM AND METHOD

(75) Inventor: Xiao Lin Yu, Fairfax, VA (US)

(73) Assignee: Xiao Lin Yu, Fairfax, VA (US)

(*) Notice: Subject to any disclaimer, the term of this patent is extended or adjusted under 35 U.S.C. 154(b) by 729 days.

(21) Appl. No.: 12/768,638

(22) Filed: Apr. 27, 2010

(65) Prior Publication Data

US 2011/0261280 A1   Oct. 27, 2011

(51) Int. Cl.
*G02F 1/1335* (2006.01)
*G02F 1/1333* (2006.01)
*G02F 1/1347* (2006.01)

(52) U.S. Cl.
USPC ............. 349/61; 349/58; 349/68; 349/74

(58) Field of Classification Search
USPC ................................. 349/68, 61, 58
See application file for complete search history.

(56) References Cited

U.S. PATENT DOCUMENTS

| | | | | |
|---|---|---|---|---|
| 5,526,146 | A * | 6/1996 | Goodman et al. | 349/5 |
| 6,369,866 | B1 * | 4/2002 | Rai et al. | 349/61 |
| 7,213,955 | B1 * | 5/2007 | Ladouceur et al. | 362/557 |
| 2003/0063456 | A1 * | 4/2003 | Katahira | 362/27 |
| 2004/0160538 | A1 * | 8/2004 | Li et al. | 349/16 |
| 2008/0198298 | A1 * | 8/2008 | Jeong et al. | 349/65 |
| 2008/0297431 | A1 * | 12/2008 | Yuuki et al. | 345/1.1 |
| 2010/0073791 | A1 | 3/2010 | Mahowald | |

* cited by examiner

*Primary Examiner* — Wen-Ying P Chen
(74) *Attorney, Agent, or Firm* — Anova Law Group, PLLC

(57) ABSTRACT

A liquid crystal display (LCD) system is provided. The LCD system includes a light-passable plate, an LCD panel and a controller. The light-passable plate is configured to allow natural light to pass through the light-passable plate; and the LCD panel is coupled to the light-passable plate and is configured to receive the natural light passing through the light-passable plate. Further, the controller is coupled to the LCD panel to control the LCD panel such that the natural light passing through the light-passable plate is used as backlight for operation of the LCD panel. The light-passable plate structurally supports the LCD panel in addition to providing the natural light to the LCD panel.

13 Claims, 15 Drawing Sheets

LIQUID CRYSTAL DISPLAY (LCD) SYSTEM AND METHOD

FIELD OF THE INVENTION

This application generally relates to liquid crystal display (LCD) technology and, more particularly, to LCD systems with improved backlight mechanisms.

BACKGROUND

A TV receiver or a computer monitor often employs a liquid crystal display (LCD) or a plasma display panel (PDP) to replace a cathode ray tube (CRT). Recently, the rapid advancement of the semiconductor techniques makes LCD panels, particularly color LCD panels more popular and less expensive.

An LCD panel is a passive display device in that the LCD panel displays light information signal that has been light-converted but does not itself emit light. Thus, an LCD device needs a light source such as a backlight unit. A conventional LCD device commonly uses a backlight unit employing a plurality of lamps to emit enough light to illuminate the LCD panel. However, a plurality of lamps not only consume a large amount of energy, but also limit the size, weight, and operational environment of the LCD device.

Some LCD devices use external light to improve the backlight unit. For example, published US patent application no. 2010/0073791 to Mahowald (the '791 application) discloses an apparatus for harnessing external light to illuminate a display screen of an electronic device. However, the '791 application explicitly addresses the problem where the external or ambient light is brighter than the illumination of the display screen by collecting external light to help illuminate the display screen. Therefore, the '791 application may not be able to overcome the shortcomings of the conventional LCD devices.

Therefore, it would be beneficial to provide systems and methods employing natural light or external light as the light source to illuminate an LCD panel. The disclosed methods and systems are directed to solve one or more problems set forth above and other problems.

BRIEF SUMMARY OF THE DISCLOSURE

One aspect of the present disclosure includes a liquid crystal display (LCD) system. The LCD system includes a light-passable plate, an LCD panel and a controller. The light-passable plate is configured to allow natural light to pass through the light-passable plate; and the LCD panel is coupled to the light-passable plate and is configured to receive the natural light passing through the light-passable plate. Further, the controller is coupled to the LCD panel to control the LCD panel such that the natural light passing through the light-passable plate is used as backlight for operation of the LCD panel. The light-passable plate structurally supports the LCD panel in addition to providing the natural light to the LCD panel.

Another aspect of the present disclosure includes a method for a liquid crystal display (LCD) system. The LCD system includes a light-passable plate, an LCD panel mounted on the light-passable plate, and a controller coupled to the LCD panel to control the LCD panel such that natural light passing through the light-passable plate is used as backlight for operation of the LCD panel. The method includes determining a configuration of the LCD system; obtaining a user input; and determining a transparency mode of the LCD system. The method also includes determining a display mode of the LCD panel based on the user input; and controlling the LCD system based on the configuration, the transparency mode, and the display mode.

Another aspect of the present disclosure includes a liquid crystal display (LCD) system. The LCD system includes a lens unit, a first light-guide plate, a first LCD panel, a second light-guide plate, and a second LCD panel. The lens unit is configured to collect natural light. The first light-guide plate is coupled to the lens unit to receive and pass the natural light; and the first LCD panel is coupled to the first light-guide plate to receive the natural light passing through the first light-guide plate. Further, the second light-guide plate is coupled to the lens unit to receive and pass the natural light; and the second LCD panel is coupled to the second light-guide plate to receive the natural light passing through the second light-guide plate. Further, the LCD system includes a reflecting film that coupled between the first light-guide plate and the second light-guide plate. The first light-guide plate and the first LCD panel are configured back-to-back with the second light-guide plate and the second LCD panel.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
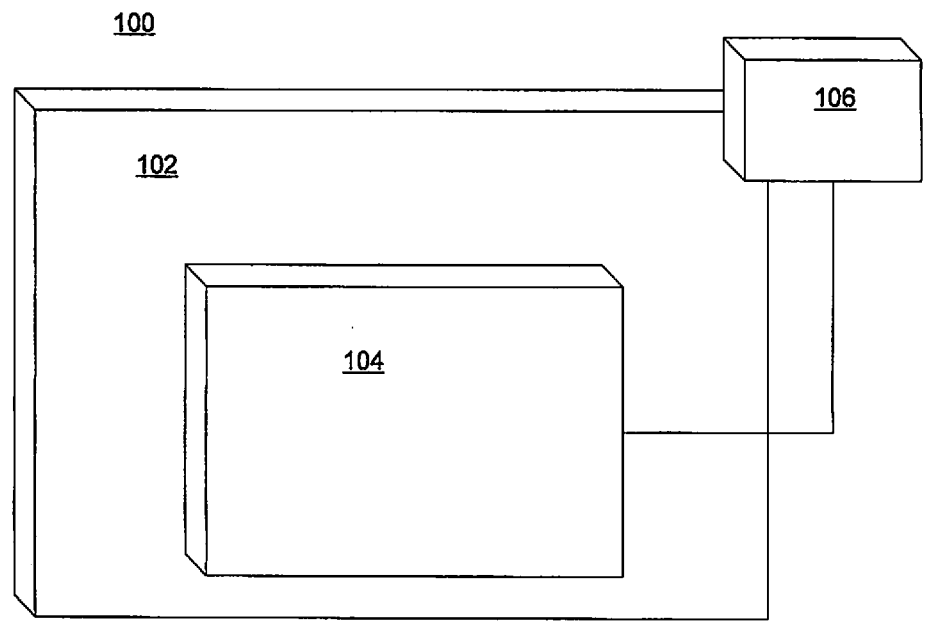
FIG. 1 illustrates an exemplary LCD system consistent with the disclosed embodiments.

FIG. 1 illustrates an exemplary LCD system 100. As shown in FIG. 1, LCD system 100 includes a window glass 102, an LCD panel 104, and a controller 106. Other components may also be included. Although LCD system 100 as illustrated is based on LCD technology, any appropriate technology may be used and LCD system 100 is not limited to LCD technology.

Window glass 102 may refer to any appropriate type of light-passable plate, such as a glass plate for windows, walls, or doors, which allows natural light to pass through. For the purpose of illustration, windows may be used to associate with window glass 102. However, any type of appropriate structures may be used to associate with window glass 102, such as doors, walls, boards, or the like. Window glass 102 may be made of any appropriate transparent material or translucent material with certain degree of transparency to let certain amount of natural light pass through.

LCD panel 104 may include any appropriate type of LCD screen or any other type of passive display screen for displaying images, texts, videos, etc. Although only one LCD panel is shown, LCD panel 104 may include one or more LCD panels. LCD panel 104 is coupled to or mounted on window glass 102 to allow natural light pass LCD panel 104 through window glass 102 and to save space between LCD panel 104 and window glass 102. That is, window glass 102 not only passes light to illuminate LCD panel 104, but also structurally supports LCD panel 104. Various mechanisms may be used to couple LCD panel 104 to window glass 102. For example, LCD panel 104 may be coupled to window glass 102 using glue (not shown) or using mechanical fasten means such as screws (not shown). For the purpose of illustration, window glass 102 coupled with LCD panel 104 and other related components, if any, may be referred as an LCD display.

Figure 2:
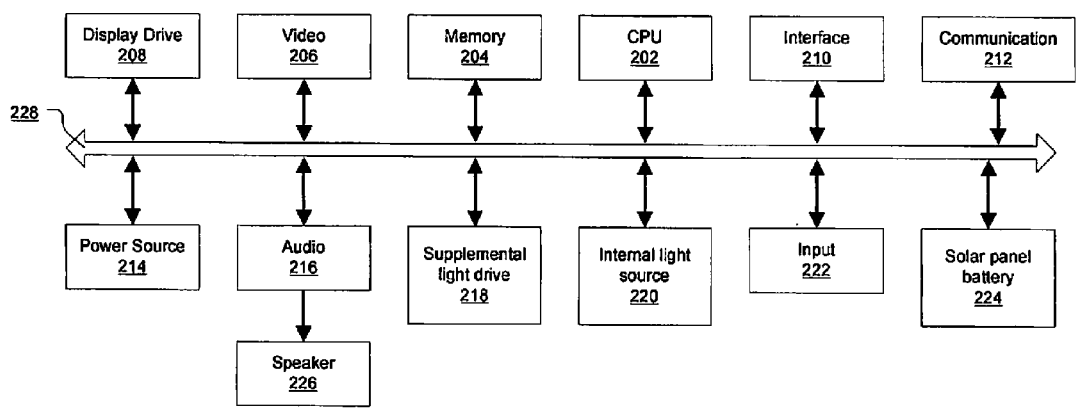
FIG. 2 illustrates an exemplary controller of an LCD system consistent with the disclosed embodiments.

Further, LCD panel 104 is couple to controller 106. Although controller 106 is illustrated as a separate unit, certain part(s) or all of controller 106 may be integrated into LCD panel 104. Controller 106 may include any appropriate device or system for controlling LCD panel 104 and providing audio, video, and picture sources to LCD panel 104. FIG. 2 shows an exemplary block diagram of controller 106.

As shown in FIG. 2, controller 106 may include a CPU 202, a memory module 204, a video unit 206, a display drive 208, an interface unit 210, a communication unit 212, a power source 214, an audio unit 216, a supplemental light drive 218, an internal light source 220, an input unit 222, a solar panel battery 224, and speaker 226. All these devices/units are listed for illustration purposes, certain devices/units may be omitted and other devices may be added without departing from the principles of the present invention. Further, a bus 228 is included to allow various devices/units coupled with CPU 202 for operation.

CPU 202 may include any appropriate type of general purpose microprocessor, digital signal processor or microcontroller. Memory module 204 may include one or more memory devices including, but not limited to, a ROM, a flash memory, a dynamic RAM, and a static RAM. Further, memory module 204 may include other storage devices such as hard disks, storage cards and disks. For example, memory module 204 may also include universal serial bus (USB) storage cards, secure digital (SD) storage cards, digital versatile disc (DVD) drive, etc. Memory module 204 may be configured to store information used by CPU 202. Memory module 204 may also be configured to store audio, video, and text information to be displayed, and driver software and upgrade software for storage devices.

Video unit 206 may include any appropriate circuitry to provide video or image information to be displayed by LCD panel 104, and display drive 208 may include circuitry to drive or control LCD panel 104. Interface unit 210 may be used for CPU 202 to interface with other devices or components, either internal or external. Further, communication unit 212 may include any appropriate type of network adaptor capable of communicating with other computer systems based on one or more communication protocols. For example, communication unit 212 may include a wireless communication unit communicating with LCD panel wirelessly.

Power source 214 may include any appropriate direct current (DC) or alternating current (AC) power supply for providing power to controller 106. Audio unit 216 may be provided to decode or generate audio information and to input the audio information to speaker 226. Further, supplemental light drive 218 may include any appropriate circuitry to drive light sources/units used for supplementing natural light, and internal light source 220 may be optionally provided to include any appropriate light devices, such as light emitting diodes (LEDs), to illuminate LCD panel 104.

Input unit 222 may include any appropriate type of input device, such as a key board, a touch screen or touch pad, a mouse, or a remote control, to allow a user of LCD system 100 to interact with LCD system 100. Solar panel battery 224 may include any appropriate type of battery based on solar energy. Further, bus 228 may include one or more control and/or data buses to couple various devices/units together for operation.

Figure 3A:
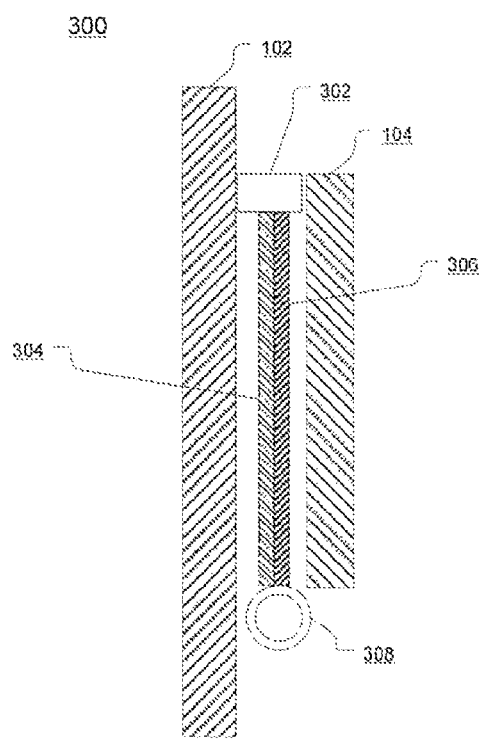
FIG. 3A illustrates an exemplary configuration of an LCD display consistent with the disclosed embodiments.

Returning to FIG. 1, natural light passing through window glass 102 illuminates LCD panel, i.e., acts as backlight for LCD panel 104. Using natural light as the backlight may not only save a significant amount of energy and space, but also improve image quality displayed on LCD panel 104 in that natural light may have a wider spectrum than artificial light such that images on an LCD panel with natural light backlight may appear more colorful and realistic looking. In operation, various configurations or setups for coupling window glass 102 and LCD panel 104 may be provided for using natural light as the backlight for LCD panel 104. FIG. 3A illustrates an exemplary configuration of window glass 102 and LCD panel 104 forming an LCD display 300.

As shown in FIG. 3A, window glass 102 and LCD panel 104 are coupled by using coupler 302. As explained previously, coupler 302 may be any appropriate chemical means or mechanical means or both to couple LCD panel 104 to window glass 102 closely. Although coupler 302 is shown on one side, coupler 302 may include any appropriate shape or structure, such as a continuous frame, or a discontinuous support structure.

Further, concentrator film 304 and diffuser film 306 are coupled or placed between window glass 102 and LCD panel 104. Concentrator film 304 may include any appropriate type of film or thin material for concentrating natural light; and diffuser film 306 may include any appropriate type of film or thin material for diffusing natural light passing through to evenly illuminate LCD panel 104.

Although concentrator film 304 and diffuser film 306 are both used for illustration purposes, either concentrator film 304 or diffuser film 306 alone may be used in certain embodiments. Further, other materials providing similar functionalities may also be used instead of concentrator film 304 and diffuser film 306. For example, a diffuser glass plate may be used in place of concentrator film 304 and diffuser film 306, and the diffuser glass plate may be closely coupled between window glass 102 and LCD panel 104. In certain other embodiments, LCD panel 104 may be directly coupled to window glass 102 without concentrator film 304 and/or diffuser film 306.

A wheeling device 308 may be provided to deploy and retract concentrator film 304 and diffuser film 306. Wheeling device 308 may include any type of device that, manually or automatically under the control of controller 106, extends concentrator film 304 and diffuser film 306 to be positioned between window glass 102 and LCD panel 104 and to cover LCD panel 104. Wheeling device 308 may also retrieve concentrator film 304 and diffuser film 306 such that natural light passing through window glass 102 illuminates LCD panel 104 without passing through concentrator film 304 and diffuser film 306.

Figure 3B:
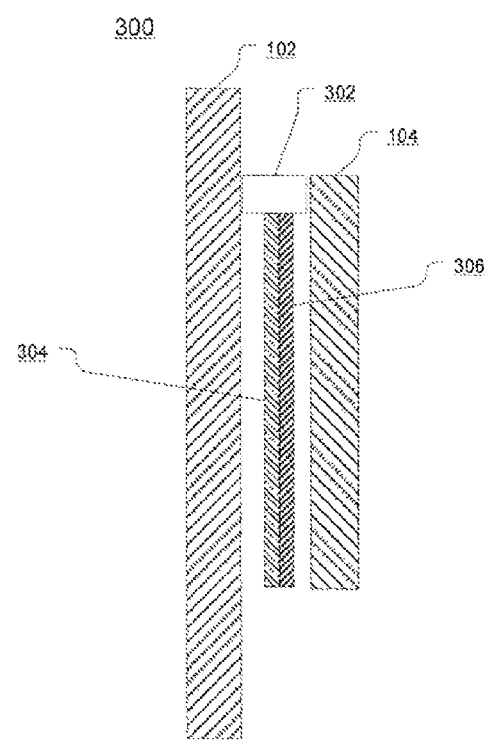
FIG. 3B illustrates another exemplary configuration of the LCD display consistent with the disclosed embodiments.

FIG. 3B illustrates another exemplary configuration of LCD display 300. As shown in FIG. 3B, LCD display 300 includes the same components as in FIG. 3A, except wheeling device 308. Thus, concentrator film 304 and diffuser film 306 are positioned between window glass 102 and LCD panel 104 without the capability of being retrieved to allow natural light pass through window glass 102 to directly illuminate LCD panel 104.

Figure 3C:
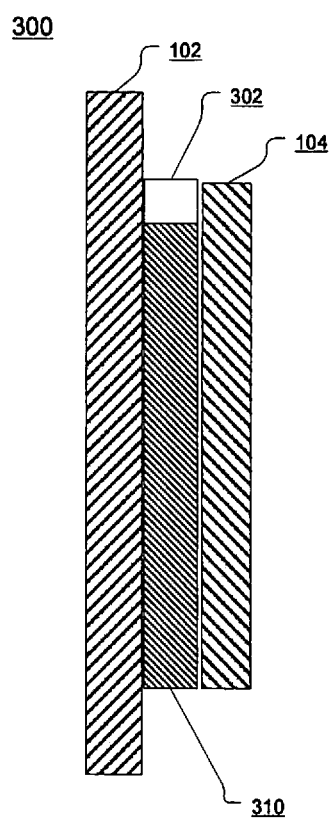
FIG. 3C illustrates another exemplary configuration of the LCD display consistent with the disclosed embodiments.

FIG. 3C illustrates another exemplary configuration of LCD display 300. As shown in FIG. 3C, LCD display 300 includes window glass 102, LCD panel 104, and coupler 302. Further, LCD display 300 may include a transparency control unit 310. Transparency control unit 310 may include any appropriate type of structure, such as a film or a glass plate, whose transparency may be controlled by electricity current or voltage applied to the structure. By changing the applied current or voltage, the transparency of transparency control unit 310 may be controlled. Further, transparency control unit 310 may also diffuse natural light passing through window glass 102 to evenly illuminate LCD panel 104.

Figure 4A:
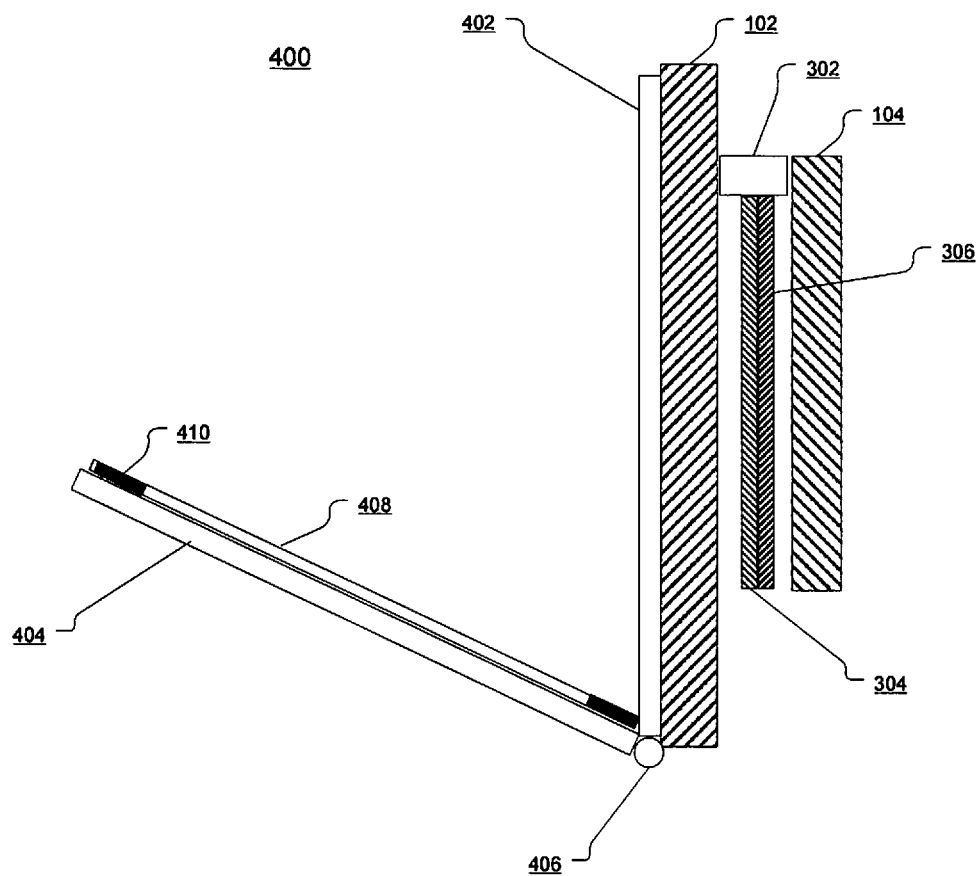
FIG. 4A illustrates an exemplary configuration of an LCD display consistent with the disclosed embodiments.

FIG. 4A illustrates an exemplary configuration of window glass 102 and LCD panel 104 forming an LCD display 400. As shown in FIG. 4A, glass 102 and LCD panel 104 are coupled by using coupler 302, and concentrator film 304 and diffuser film 306 are placed between window glass 102 and LCD panel 104. Further, a frame 402 is coupled to window glass 102 on the side opposite to LCD panel 104. A reflector 404 is coupled to frame 402 via coupler 406 such that reflector 404 may be rotated to and from frame 402.

Reflector 404 may include a reflecting surface such that reflector 404 may reflect natural light to window glass 102 and to increase amount of natural light passing through window glass 102. Coupler 406 may include any appropriate structure such that reflector 404 may rotate manually or automatically along an axis of coupler 406 with respect to frame 402, such as a motor or a hinge. For example, reflector 404 may rotate to a closed position, i.e., reflector 404 fits into frame 402, or at any angle with respect to frame 402 such that the light reflected to window glass 102 is suitable for properly illuminating LCD panel 104. Reflector 404 may be used to improve or supplement natural light passing through window glass 102.

Further, reflector 404 may include a light-guide 408 and a light source 410. Light-guide 408 may include any appropriate material to guide light emitted by light source 410 to pass through window glass 102. Light source 410 may include one or more lamps or LEDs to supplement or replace natural light. For example, if natural light or natural light improved by light reflected by reflector 404 is sufficient to illuminate LCD panel 104, light source 410 might remain turned off. However, if the natural light is not sufficient, light source 410 may emit light to supplement or replace the natural light to illuminate LCD panel 104. When reflector 404 is rotated to the closed position, no natural light passes through window glass 102 and light source 410 becomes the only light source to illuminate LCD panel 104.

In certain embodiments, window glass 102 may be omitted. LCD panel 104 may be coupled to frame 402 via coupler 302. That is, LCD panel 104 coupled with frame 402 may act as a window or the like, when mounted on window frames, walls, doors, and similar structures.

Figure 4B:
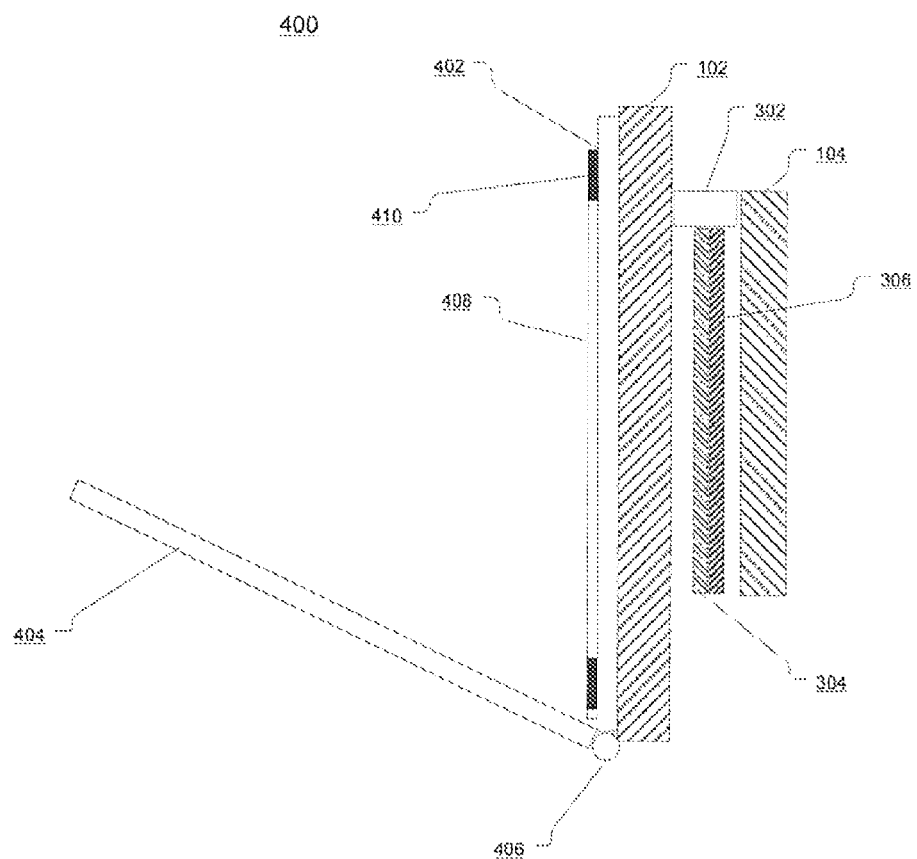
FIG. 4B illustrates another exemplary configuration of the LCD display consistent with the disclosed embodiments.

FIG. 4B illustrates another exemplary configuration of LCD display 400. As shown in FIG. 4B, the LCD display includes the same components as in FIG. 4A, except that light-guide 408 and light source 410 are coupled to frame 402. Light emitted from light source 410, via light-guide 408, may directly pass through window glass 102 in straight angle (e.g., about 90 degrees) when supplementing the natural light. Further, in certain embodiments, window glass 102 may coincide with light-guide 408. In certain other embodiments, light-guide 408 and/or window glass 102 may contain a matte surface such that concentrator film 304 and/or diffuser film 306 may be omitted.

Figure 5:
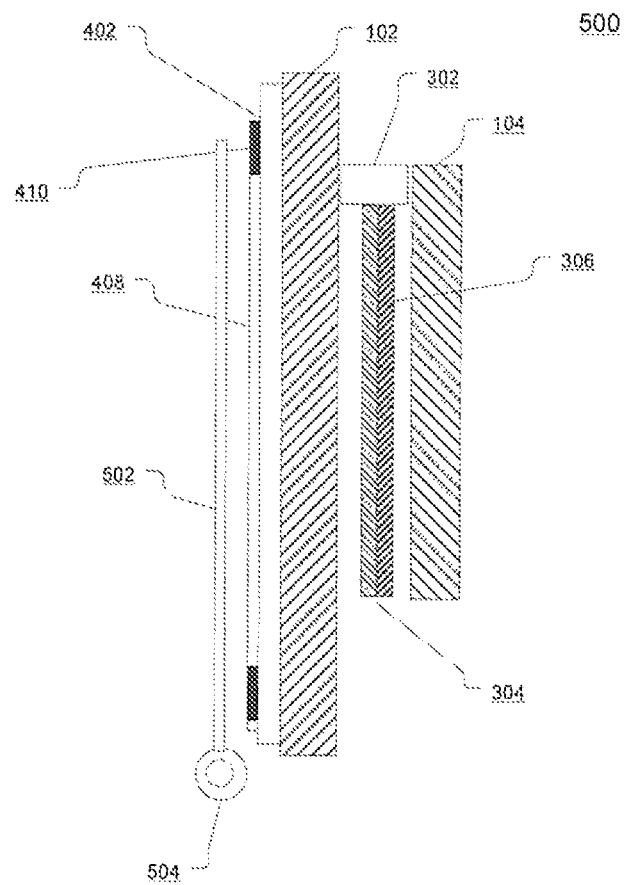
FIG. 5 illustrates an exemplary configuration of an LCD display consistent with the disclosed embodiments.

FIG. 5 illustrates an exemplary configuration of window glass 102 and LCD panel 104 forming an LCD display 500. As shown in FIG. 5, glass 102 and LCD panel 104 are coupled by using coupler 302, and concentrator film 304 and diffuser film 306 are placed between window glass 102 and LCD panel 104. A frame 402 is coupled to window glass 102 on the side opposite to LCD panel 104.

A light-guide 408 and a light source 410 are coupled to frame 402. As previously explained, light-guide 408 guides light emitted by light source 410 to pass through window glass 102. Further, a reflecting film 502 may be positioned to cover light-guide 408. A wheeling unit 504 may be provided to deploy and retrieve reflecting film 502, manually or automatically under the control of controller 106. When natural light is sufficient to illuminate LCD panel 104, light source 410 may be turned off, and wheeling unit 504 retrieves reflecting film 502 to allow natural light to pass window glass 102 to illuminate LCD panel 104. On the other hand, when natural light is not sufficient to illuminate LCD panel 104, light source 410 may be turned on, and wheeling unit 504 deploys reflecting film 502 to reflect light emitted from light source 410 to improve efficiency of light source 410.

Figure 6:
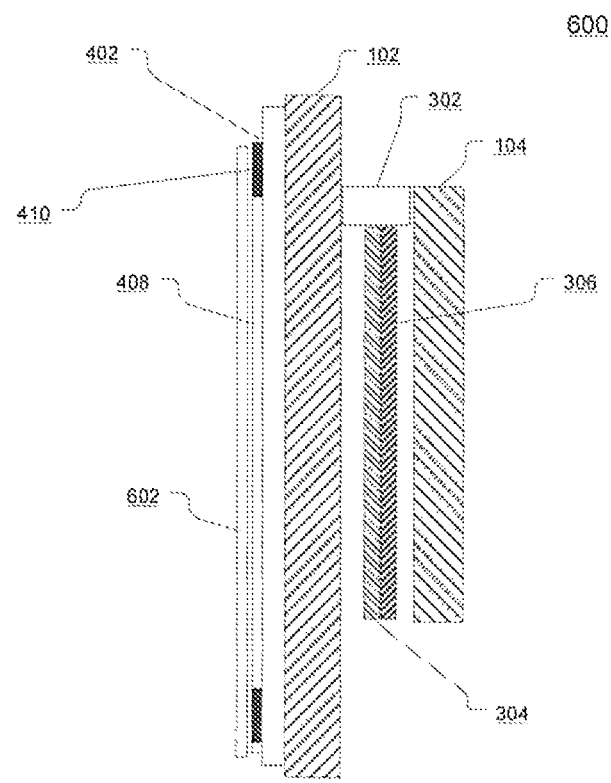
FIG. 6 illustrates an exemplary configuration of an LCD display consistent with the disclosed embodiments.

FIG. 6 illustrates an exemplary configuration of window glass 102 and LCD panel 104 forming an LCD display 600. As shown in FIG. 6, LCD display 600 includes window glass 102, LCD panel 104, coupler 302, concentrator film 304, diffuser film 306, frame 402, light-guide 408, and light source 410, as explained previously. Further, a single-direction film 602 may be positioned above light-guide 408 and may also be coupled to frame 402.

Single-direction film 602 may include any optical thin material that allows light pass through from one direction only and may reflect light from a reverse direction, such as a one-way mirror or any type of single direction transmission film or thin plate. Natural light may pass through single-direction film 602 to illuminate LCD panel 104 without turning on light source 410. However, when natural light is not sufficient, light source 410 may be turned on, light emitted from light source 410 may be provided by concentrator film 304 to illuminate LCD panel 104. Further, some light emitted from light source 410 may be reflected back by single-direction film 602 to improve the illumination of LCD panel 104.

Figure 7A:
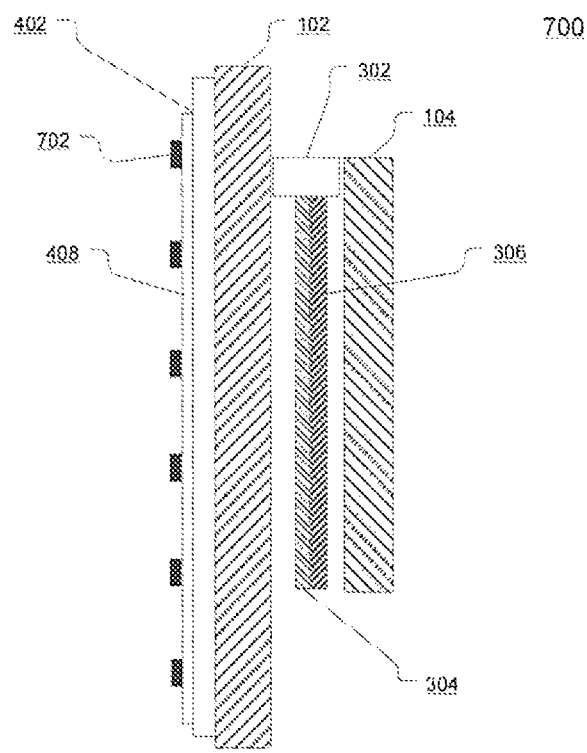
FIG. 7A illustrates an exemplary configuration of an LCD display consistent with the disclosed embodiments.

FIG. 7A illustrates an exemplary configuration of window glass 102 and LCD panel 104 forming an LCD display 700. As shown in FIG. 7A, LCD display 700 may include window glass 102, LCD panel 104, coupler 302, concentrator film 304, diffuser film 306, frame 402, and light-guide 408, as explained previously. Further, a plurality of LEDs 702 may be attached to light-guide 408. Natural light may pass through light-guide 408 to illuminate LCD panel 104 without turning on LEDs 702. However, when natural light is not sufficient, LEDs 702 may be turned on, light emitted from LEDs 702 may illuminate LCD panel 104 to supplement or replace natural light.

Figure 7B:
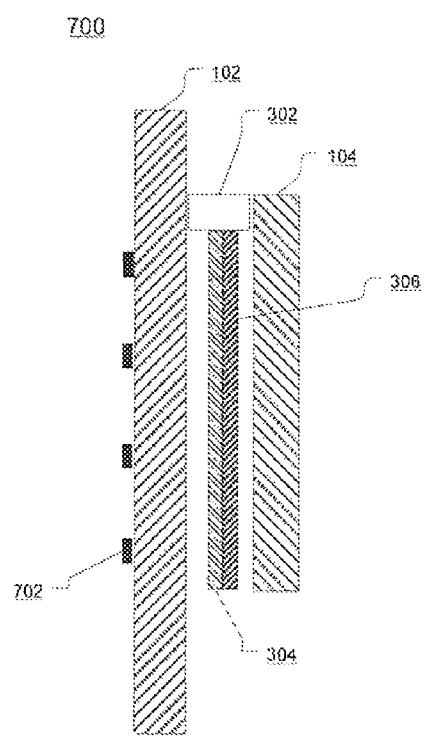
FIG. 7B illustrates another exemplary configuration of the LCD display consistent with the disclosed embodiments.
Figure 7C:
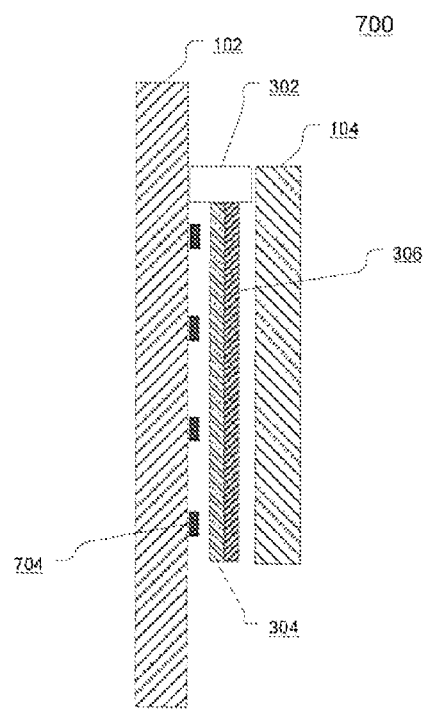
FIG. 7C illustrates another exemplary configuration of the LCD display consistent with the disclosed embodiments.

FIG. 7B and FIG. 7C illustrate simplified configurations from that in FIG. 7A. As shown in FIG. 7B, LEDs 702 are attached to the outside of window glass 102 directly, without frame 402 and light-guide 408, to provide light source to supplement or replace natural light. As shown in FIG. 7C, LEDs 702 are attached to the inside of window glass 102 directly, without frame 402 and light-guide 408, to provide a light source to supplement or replace natural light.

Figure 8:
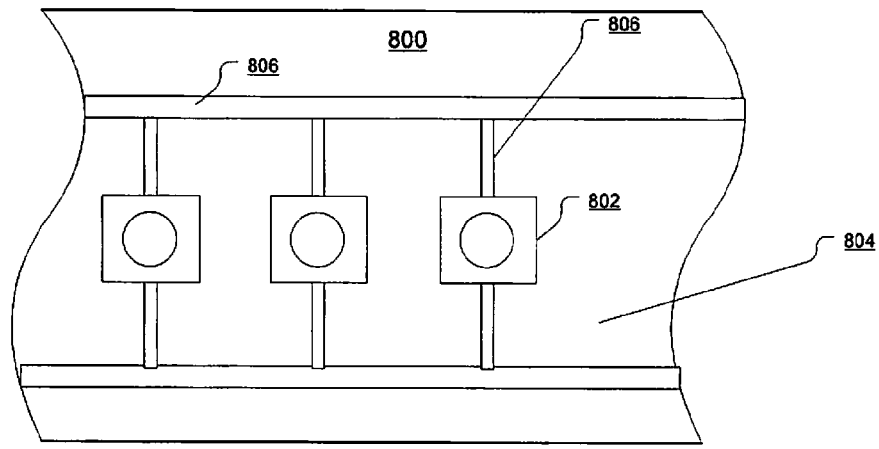
FIG. 8 illustrates an exemplary LED belt consistent with the disclosed embodiments.

The plurality of LEDs 702 may be arranged in any appropriate ways. FIG. 8 illustrates an exemplary LED belt 800 for arranging LEDs. As shown in FIG. 8, LED belt 800 includes a plurality of LED elements 802, transparent film 804, and electrically conductive lines 806. Each LED element 802 may include one or more LEDs for illuminating LCD panel 104. Electrically conductive lines 806 are provided to connect the plurality of LED elements to an electricity current source (not shown). Electrically conductive lines 806 may include any appropriate electrically conductive materials for connecting the plurality of LED elements, such as metal wires or transparent conductors (e.g., electrically conductive glue).

Figure 9A:
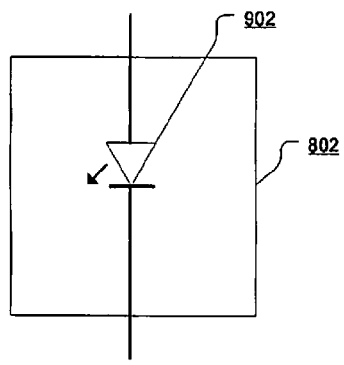
FIG. 9A illustrates an exemplary configuration of an LED element consistent with the disclosed embodiments.
Figure 9B:
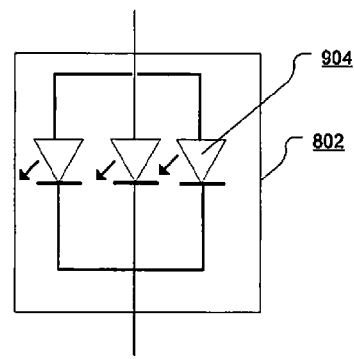
FIG. 9B illustrates another exemplary configuration of the LED element consistent with the disclosed embodiments.
Figure 9C:
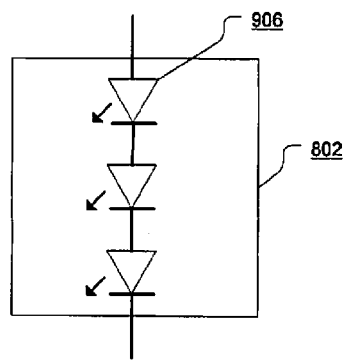
FIG. 9C illustrates another exemplary configuration of the LED element consistent with the disclosed embodiments.
Figure 9D:
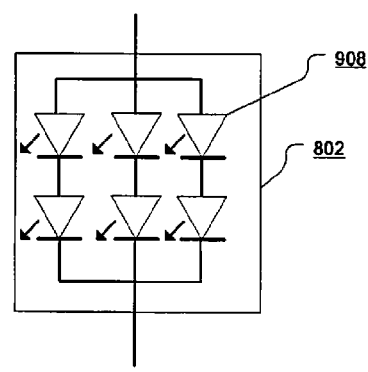
FIG. 9D illustrates another exemplary configuration of the LED element consistent with the disclosed embodiments.

Further, LED element 802 may include one or more LEDs, including LEDs emitting white light and LEDs emitting various color light, such as red, blue, and green light. FIG. 9A, 9B, 9C, and 9D illustrates exemplary LED element configurations. More particularly, FIG. 9A illustrates that an LED element 802 includes a single LED 902. FIG. 9B illustrates that an LED element 802 includes a plurality of LEDs 904 connected in parallel. Although three LEDs are shown, any number of LEDs may be used. FIG. 9C illustrates that an LED element 802 includes a plurality of LEDs 906 connected in series. Again, although three LEDs are shown, any number of LEDs may be used. Finally, FIG. 9D illustrates that an LED element 802 includes a plurality LEDs 908 connected in parallel and in series. Although FIG. 9D shows two LEDs are connected in series and three series of LEDs are connected in parallel, any number of LEDs may be connected in parallel and/or in series.

Figure 10:
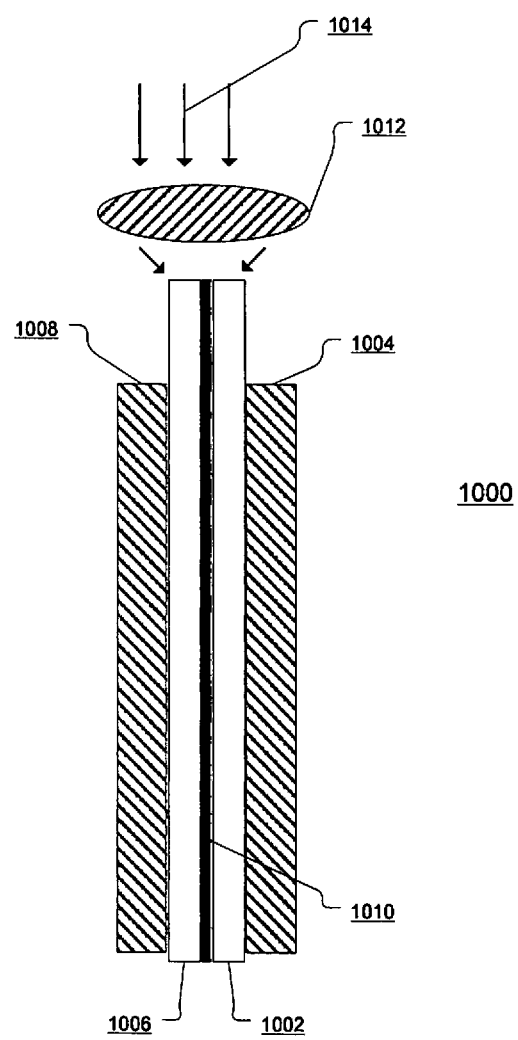
FIG. 10 illustrates an exemplary configuration of an LCD display consistent with the disclosed embodiments.

FIG. 10 illustrates an exemplary configuration of an LCD display 1000. As shown in FIG. 10, LCD display 1000 includes a light-guide 1002 and an LCD panel 1004 on one side of LCD display 1000, a light-guide 1006 and an LCD panel 1008 on the other side of LCD display 1000, and a reflecting film 1010. Light-guide 1002 and light-guide 1006 may be coupled together, and may include any appropriate structure such as a plate. Reflecting film 1010 may be placed between light-guide 1002 and light-guide 1006. Further, LCD display 1000 also includes a lens unit 1012 coupled to light-guide 1002 and light-guide 1006.

Lens unit 1012 may include any material and structure suitable collecting natural light 1014 and pass to light-guides 1002 and 1006. Although not shown, lens unit 1012 may be coupled to light-guide 1002 and light-guide 1006 via any appropriate means, such as direct coupling or optical fiber coupling. If optical fiber coupling is used, lens unit 1012 may be placed remotely and passes natural light through optical fibers to light-guides 1002 and 1006.

Natural light collected by lens unit 1012 passes through light-guides 1002 and 1006 to illuminate LCD panels 1004 and 1008, respectively. Reflecting film 1010 also reflects natural light back to LCD panels 1004 and 1008. Although two light-guides and LCD panels are illustrated in FIG. 10, a single-sided light-guide and LCD panel may also be used. Further, LEDs (not shown) may also be provided to supplement natural light by, as explained previously, attaching to a side of light-guide 1002 or 1006 or both.

In certain embodiments, light guide 1002 and light-guide 1006 may be pressed, molded, welded, or adhered into a single light-guide, while reflecting film 1010 may also be pressed, molded, welded, or adhered into the single light-guide. Further, in certain other embodiments used in an environment with strong natural light, reflecting film 1010 may be omitted in the single light-guide.

Figure 11:
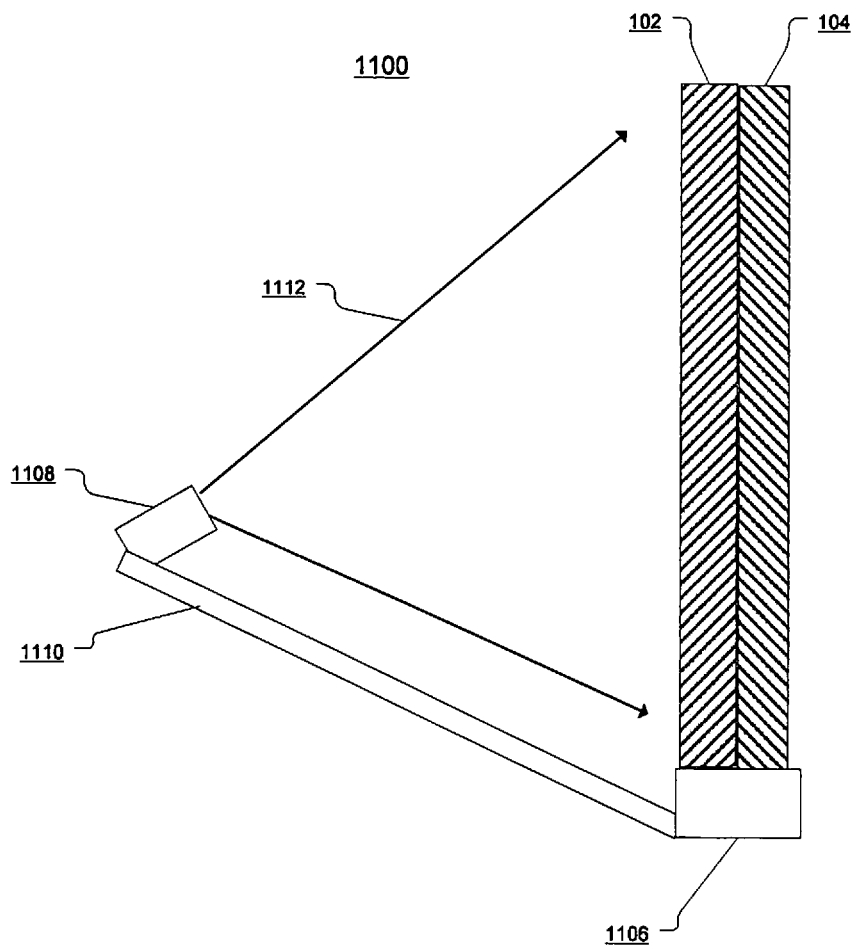
FIG. 11 illustrates an exemplary configuration of an LCD display consistent with the disclosed embodiments.

FIG. 11 illustrates an exemplary configuration of an LCD display 1100. As shown in FIG. 11, LCD display 1100 includes window glass 102, LCD panel 104, and a base 1106. Window glass 102 may also include any appropriate transparent or translucent material for passing natural light to relatively evenly illuminate LCD panel 104. For example, window glass 102 may include a diffuser glass or the like. LCD panel 104 may include one or more LCD panels as explained previously. Base 1106 may include any appropriate structure configured to support window glass 102 and LCD panel 104 and any other applicable components. Natural light pass through window glass 102 to illuminate LCD panel 104.

Further, LCD display 1100 may also include one or more projection lamps 1108 to emit light to supplement natural light when natural light is not sufficient, such as at night or in an environment or weather with insufficient ambient light. One or more support beams 1110 are coupled to base 1106 at one end and to one or more lamps at the other end to support one or more lamps 1108. Lamps 1108 and support beams 1110 are configured in certain ways such that light 1112 emitted from lamps 1108 illuminates about entire area of window glass 102 relatively evenly. Other structures may also be used.

The above various configurations of LCD displays are described for illustration purposes. The various configurations may be used interchangeably and/or may be used in combination. For example, mechanisms of coupling window glass 102 and LCD panel 104 and of supplementing natural light in various configurations may be used in different configurations and/or may be combined in a single configuration.

Returning to FIG. 1, controller 106 may automatically control LCD system 100 in operation. In certain embodiments, because natural light is used to illuminate LCD panel 104, the amount of energy, circuitry, and space may be saved such that controller 106 may be fully integrated into LCD panel 104 without external power sources. Thus, LCD system 100 may be deployed in a self-contained manner, perhaps with a solar energy unit for supplying a small amount of power for system operation.

Figure 12:
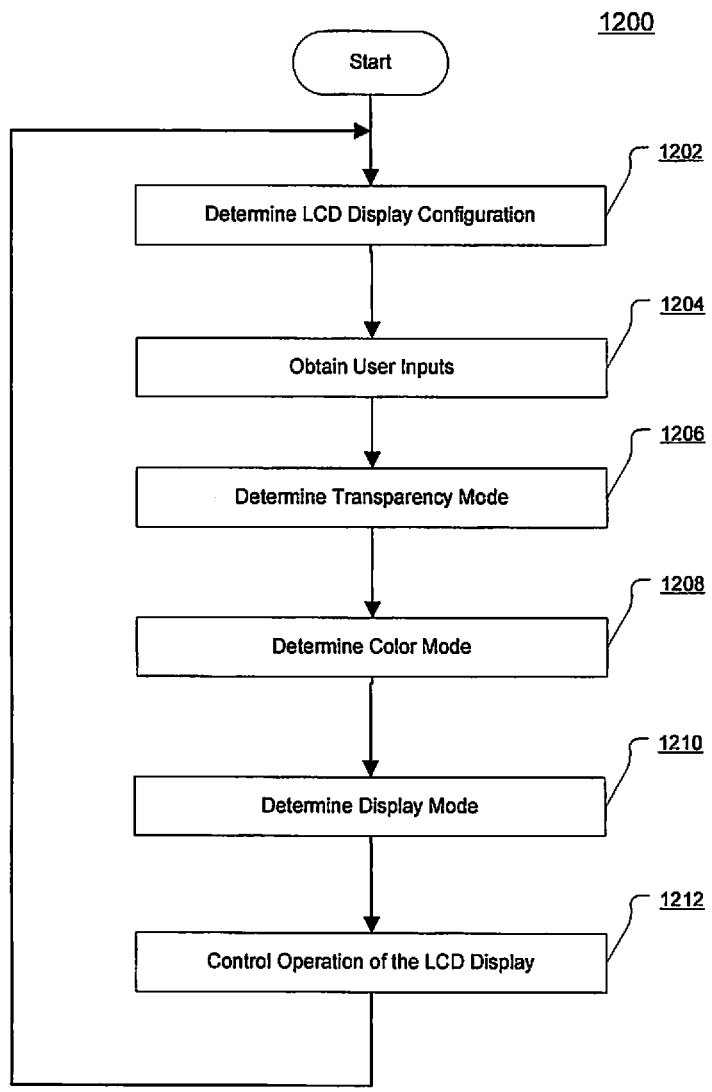
FIG. 12 illustrates an exemplary operation process for an LCD system consistent with the disclosed embodiments.

In operation, controller 106 and, more particularly, CPU 202 may execute computer instructions to perform certain actions to control operation of LCD system 100. FIG. 12 illustrates an exemplary process 1200 performed by controller 106 or, more specifically, by CPU 202 of controller 106.

As shown in FIG. 12, in operation, CPU 202 may determine LCD display configuration (1202). The configuration may include information about various LCD display configurations explained previously, such as types and mechanisms of supplemental light, and operation parameters for natural light operation (i.e., natural light as the only light source to illuminate an LCD panel) and natural light and supplemental light operation (i.e., supplemental light is provided to illuminate the LCD panel), etc. CPU 202 may determine the LCD configuration based on predefined criteria. For example, CPU 202 may read information from a database or a file, or CPU 202 may determine the configuration in real-time by obtaining information from related devices.

CPU 202 may also obtain user inputs (1204). A user of LCD system 100 may input certain information to control and/or operate LCD system 100. For example, the user may choose a transparency mode, a color mode, and a display mode, as described below, as well as what contents to be displayed on LCD system 100. For example, the user may choose to display a still image, a video image, text messages, or any combination thereof via input unit 222.

Based on the user input and/or preconfigured parameters, CPU 202 may determine a transparency mode for the LCD display (1206). For illustration purpose, LCD display configuration as shown in FIG. 3C is used to describe transparency mode operation, which may also be incorporated into other configurations without departing from the principle of the disclosed embodiments.

CPU 202 may determine a full-transparent mode, in which CPU 202 may control transparency control unit 310 to be fully transparent, and may also control LCD panel 104 to be transparent as well. CPU 202 may also determine a translucent mode, in which CPU 202 may control transparency control unit 310 to reach a certain degree of transparency based on preconfigured parameters or user inputs.

Further, CPU 202 may also determine a color mode for the LCD display (1208). CPU 202 may set a color for LCD panel 104 to display according to the color mode. For example, CPU 202 may set a black-and-white mode for LCD panel 104, which may include the range from a transparent LCD panel to a black LCD panel. CPU 202 may also set a particular color for LCD panel 104 to be displayed in combination of different transparency degrees to have a desired visual effect.

CPU 202 may also determine a display mode for the LCD display (1210). For example, CPU 202 may determine a display mode for LCD panel 104 as one of a window mode, an entertainment mode, or a bulletin mode. Other modes may also be used. When selecting the window mode, CPU 202 may control LCD panel 104 to be transparent such that a transparent window may be provided for the user. Further, the user may select certain images that are complimentary of sceneries outside the window (i.e., at the opposite side of LCD panel 104), and CPU 202 may obtain the user's selection and control LCD panel 104 to display the certain images together with the outside sceneries. CPU 202 may also control LCD panel 104 to display certain color statically or dynamically such that a window with a various degree of transparency and colors may be provided for the user.

Further, when the user prefers to watch a video or the like, CPU 202 may select the entertainment mode for LCD panel 104. CPU 202 may also select a bulletin mode if the user prefers to use LCD system for displaying public information or other text based information, where the transparency mode may be set to the translucent mode to have desired visual effects.

Figure 13:
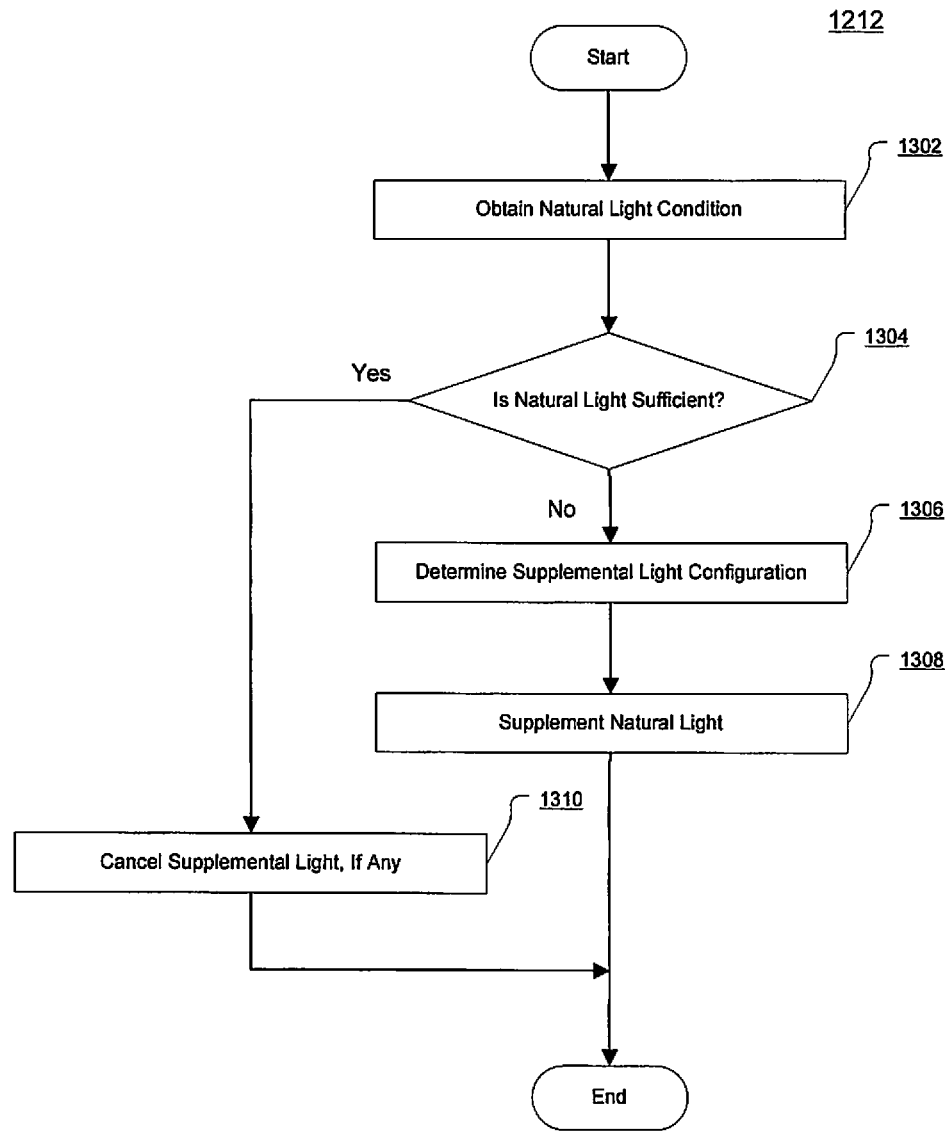
FIG. 13 illustrates an exemplary control process for an LCD system consistent with the disclosed embodiments.

After determining the various modes for LCD display (1206, 1208, 1210), CPU 202 may control operation of the LCD display according to the configuration, the user input, and the various modes (1212). FIG. 13 shows an exemplary control process 1212.

As shown in FIG. 13, CPU 202 may obtain a natural light condition (1302). For example, CPU 202 may obtain the strength, brightness, or other characteristics of natural light from sensors or other devices (not shown). CPU 202 may also obtain the natural light condition based on a user input. Further, CPU 202 may determine whether natural light is sufficient to illuminate LCD panel 104 (1304).

If CPU 202 determines that natural light is sufficient to illuminate LCD panel 104 (1304; yes), CPU 202 may continue using natural light as the light source for illuminating LCD panel 104 and turn off or cancel any supplemental light sources, such as reflector, LEDs, and/or projection lamps (1310). On the other hand, if CPU 202 determines that natural light is not sufficient to illuminate LCD panel 104 (1304; no), CPU 202 may determine available supplemental light configuration (1306). For example, CPU 202 may determine whether LCD system 100 includes any supplemental light source or sources for illuminating LCD panel 104, such as reflector, LEDs, and/or projection lamps. Further, CPU 202 may control relevant supplemental light source or sources to supplement the natural light (1308). For example, CPU 202 may turn on LEDs, deploy reflectors or reflecting films, and/or turn on projection lamps. Other steps and actions may also be included.

Other embodiments of the disclosure will be apparent to those skilled in the art from consideration of the specification and practice of the disclosure herein. It is intended that the specification and examples be considered as exemplary only, with the scope being indicated by the following claims.

What is claimed is:

1. A liquid crystal display (LCD) system, comprising:
   a light-passable plate configured to allow natural light to pass through the light-passable plate;
   an LCD panel coupled to the light-passable plate and configured to receive the natural light passing through the light-passable plate;
   a transparency control unit coupled between the light-passable plate and the LCD panel to control a degree of transparency for the combination of the light-passable plate, the transparency control unit, and the LCD panel;
   a controller coupled to the LCD panel to control the LCD panel such that the natural light passing through the light-passable plate is used as backlight for operation of the LCD panel;
   a concentrator film and a diffuser film, wherein the concentrator film and the diffuser film are coupled between the light-passable plate and the LCD panel; and
   a wheeling unit configured to deploy the concentrator film and the diffuser film to cover the LCD panel, and to retrieve the concentrator film and the diffuser film to uncover the LCD panel,
   wherein the light-passable plate structurally supports the LCD panel in addition to providing the natural light to the LCD panel.

2. The LCD system according to claim 1, further including:
   one or more supplemental light sources configured to supplement the natural light for illuminating the LCD panel under the control of the controller.

3. The LCD system according to claim 1, further including:
   a frame coupled to the light-passable plate;
   a reflector coupled to the frame and rotatable to a position for reflecting light to illuminate the LCD panel;
   a light source coupled to the reflector to further supplement the natural light.

4. The LCD system according to claim 1, further including:
   a frame coupled to the light-passable plate;

a light source coupled to the frame to supplement the natural light.

5. The LCD system according to claim 4, further including:
a reflecting film; and
a wheeling unit configured to deploy the reflecting film to cover the light-passable plate, and to retrieve the reflecting film to uncover the light-passable plate.

6. The LCD system according to claim 2, wherein
the one or more supplemental light sources include a plurality of transparent LED belts attached to one side of the light-passable plate.

7. A liquid crystal display (LCD) system, comprising:
a light-passable plate configured to allow natural light to pass through the light-passable plate;
an LCD panel coupled to the light-passable plate and configured to receive the natural light passing through the light-passable plate;
a transparency control unit coupled between the light-passable plate and the LCD panel to control a degree of transparency for the combination of the light-passable plate, the transparency control unit, and the LCD panel; and
a controller coupled to the LCD panel to control the LCD panel such that the natural light passing through the light-passable plate is used as backlight for operation of the LCD panel; and
one or more supplemental light sources configured to supplement the natural light for illuminating the LCD panel under the control of the controller,
wherein the light-passable plate structurally supports the LCD panel in addition to providing the natural light to the LCD panel;
the one or more supplemental light sources include a projection lamp; and
the projection lamp is coupled to a base of the LCD system using a supporting beam.

8. A liquid crystal display (LCD) system, comprising:
a lens unit configured to collect natural light;
a first light-guide plate coupled to the lens unit to receive and pass the natural light;
a first LCD panel coupled to the first light-guide plate to receive the natural light passing through the first light-guide plate;
a second light-guide plate coupled to the lens unit to receive and pass the natural light;
a second LCD panel coupled to the second light-guide plate to receive the natural light passing through the second light-guide plate; and
a reflecting film coupled between the first light-guide plate and the second light-guide plate,
wherein the first light-guide plate and the first LCD panel are configured back-to-back with the second light-guide plate and the second LCD panel.

9. The LCD system according to claim 8, further including:
one or more supplemental light sources coupled to the first and second light-guide plates and configured to supplement the natural light for illuminating the first and second LCD panels.

10. The LCD system according to claim 8, further including:
a transparency control unit coupled between the light-passable plate and the LCD panel to control a degree of transparency for the combination of the light-passable plate, the transparency control unit, and the LCD panel.

11. The LCD system according to claim 8, further including:
a wheeling unit configured to deploy the reflecting film to cover the light-passable plate, and to retrieve the reflecting film to uncover the light-passable plate.

12. The LCD system according to claim 8, further including:
the one or more supplemental light sources include a projection lamp.

13. The LCD system according to claim 8, further including:
the one or more supplemental light sources include a plurality of transparent LED belts attached to one side of the light-passable plate.

* * * * *